United States Patent [19]

Dalzell et al.

[11] Patent Number: 5,434,707
[45] Date of Patent: Jul. 18, 1995

[54] SHAPED PLASTIC LIGHT-POLARIZING LENS AND METHOD OF MAKING SAME

[75] Inventors: William H. Dalzell, Marshfield; Igor Loshak, Brighton; Nancy J. Gettens, Waban; Carole L. G. McCarthy, Duxbury, all of Mass.

[73] Assignee: Polaroid Corporation, Cambridge, Mass.

[21] Appl. No.: 122,231

[22] Filed: Sep. 14, 1993

[51] Int. Cl.⁶ .................. G02B 5/30; G02B 1/08; G02C 7/10; G02C 7/12
[52] U.S. Cl. .................. 359/485; 264/1.3; 264/1.7; 264/1.32; 351/49; 351/163; 359/490; 359/491
[58] Field of Search ................. 351/49, 163; 359/485, 359/487, 490, 491, 492, 493; 264/1.3, 1.7

[56] References Cited

U.S. PATENT DOCUMENTS

| | | | |
|---|---|---|---|
| 2,263,249 | 11/1941 | Rogers | 351/163 |
| 2,320,375 | 6/1943 | Moulton | 88/65 |
| 2,387,308 | 10/1945 | Styll | 88/65 |
| 3,051,054 | 8/1962 | Crandon | 351/163 |
| 3,211,047 | 10/1965 | Heimberger | 351/49 |
| 3,245,315 | 4/1966 | Marks et al. | 351/49 |
| 3,560,076 | 2/1971 | Ceppi | 350/155 |
| 3,674,587 | 7/1972 | Laliberte | 351/163 |
| 3,711,417 | 1/1973 | Schuler | 351/163 |
| 3,786,119 | 1/1974 | Ortlieb | 351/163 |
| 3,940,304 | 2/1976 | Schuler | 156/245 |
| 3,944,346 | 3/1976 | Shindler | 351/49 |
| 4,741,611 | 5/1988 | Burns | 351/44 |
| 4,838,673 | 6/1989 | Richards et al. | 351/49 |
| 4,923,758 | 5/1990 | Marks et al. | 351/163 |
| 4,986,648 | 1/1991 | Kobayashi et al. | 351/160 |
| 5,043,405 | 8/1991 | Koseki et al. | 526/245 |
| 5,327,180 | 7/1994 | Hester, III et al. | 351/49 |

FOREIGN PATENT DOCUMENTS 1080678 6/1954 France .
1116383 11/1961 Germany .

OTHER PUBLICATIONS

Chemical Rubber Co. (pub.), Handbook Of Chemistry & Physics, 53th Edition, 1972, p. F-85.

Primary Examiner—Martin Lerner
Attorney, Agent, or Firm—Louis G. Xiarhos

[57] ABSTRACT

Plastic lenses having substantially no optical power and a light-polarizing layer therein are prepared by shaping composite laminate of the light-polarizing layer between opposed sheets of thermoplastic material by heating and pressing the laminate between opposed shaping molds (platens), the platens having predetermined radii of curvature for the production of a lens having substantially no optical power. Shaping is effected under conditions of heating and pressing sufficient to cause flow of the thermoplastic sheets and conformation thereof to the respective curvatures of the forming surfaces of the platens. The lenses are especially suited as sunglass lenses for spectacles.

11 Claims, 3 Drawing Sheets

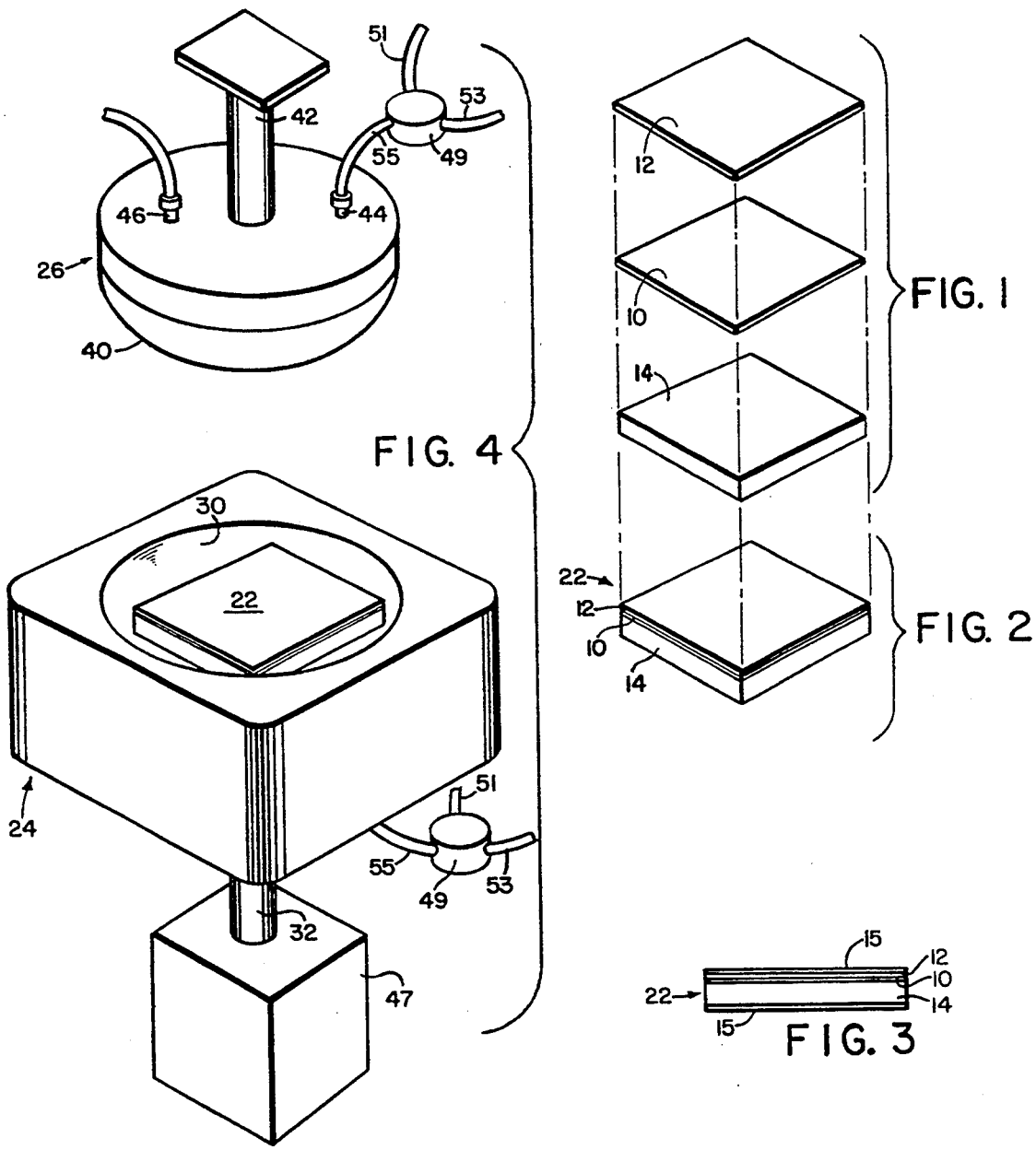

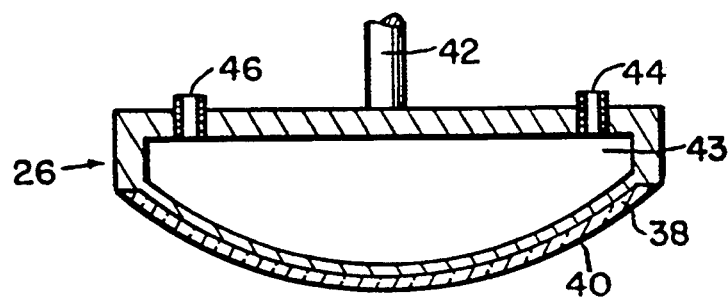
FIG. 5
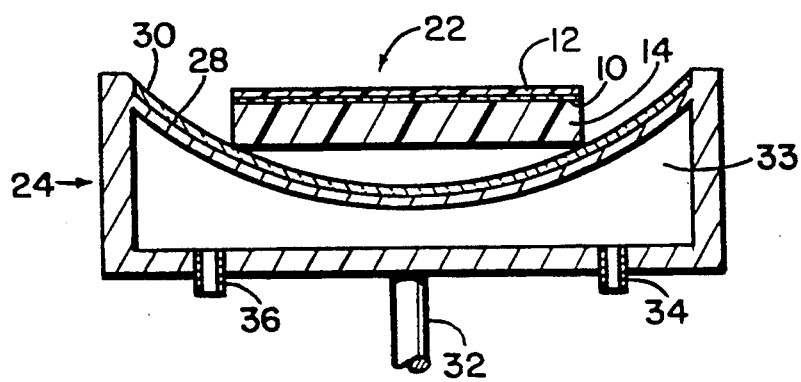
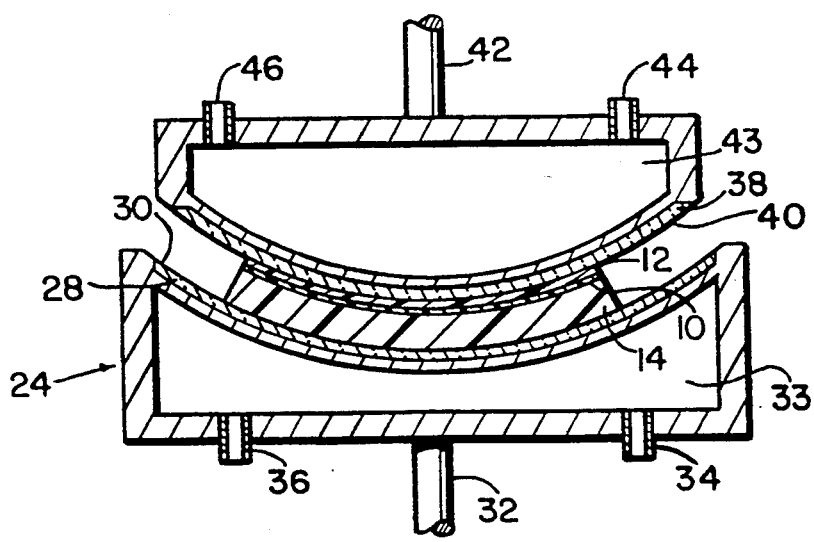
FIG. 6

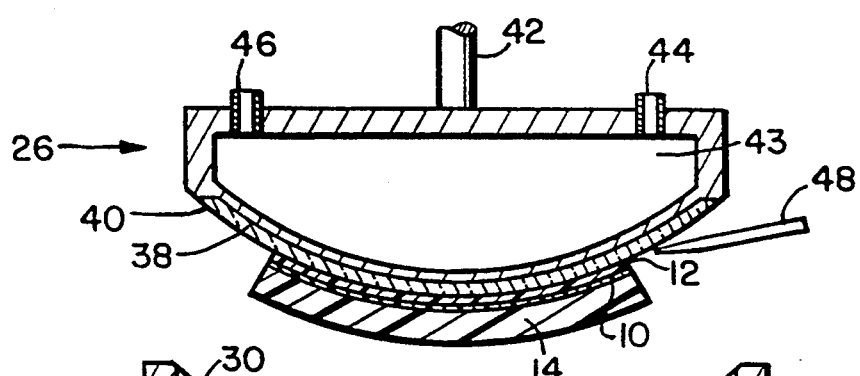
FIG. 7
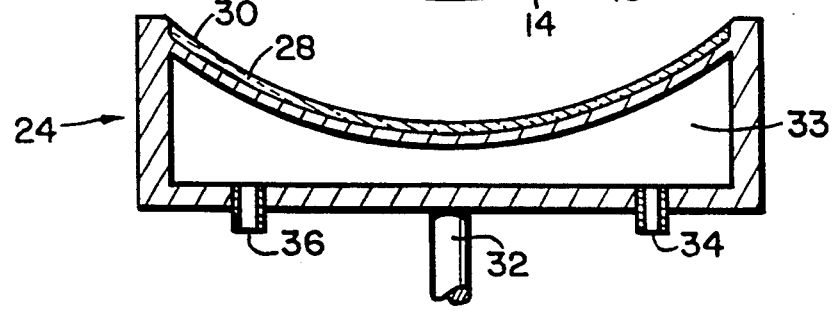
FIG. 8

SHAPED PLASTIC LIGHT-POLARIZING LENS AND METHOD OF MAKING SAME

BACKGROUND OF THE INVENTION

This invention relates to formed plastic light-polarizing lenses and to a method for their production. More particularly, it relates to plastic light-polarizing lenses having no optical power, good durability and abrasion-resistant properties, and to a method of forming such lenses in a simple and effective manner.

Curved light-polarizing laminates useful as lenses and comprising a layer of molecularly oriented light-polarizing material between a pair of substrate sheets or plates have been known. For example, curved lenses of such character have been described in U.S. Pat. No. 2,320,375 (issued Jun. 1, 1943 to H. R. Moulton); U.S. Pat. No. 2,387,308 (issued Oct. 23, 1945 to H. H. Styll); U.S. Pat. No. 3,560,076 (issued Feb. 2, 1971 to F. G. Ceppi); and U.S. Pat. No. 3,940,304 (issued Feb. 24, 1976 to N. W. Schuler). The curved laminates may be formed between shaping molds (as taught, for example, in the aforementioned U.S. Pat. Nos. 2,320,375, 2,387,308 and 3,560,076) or may be the result of a grinding operation (such as is described in U.S. Pat. No. 2,387,308). Alternatively, a curved lens having a light polarizer therein can be prepared by the in situ polymerization of a polymerizable monomer in a pair of shaped molds having a light polarizer confined therebetween, as is taught in the aforementioned U.S. Pat. No. 3,940,304.

In general, plastic light-polarizing lenses such as are suitable for application in the manufacture of sunglasses should exhibit little or no optical power (i.e., no magnification or demagnification), should have good durability and abrasion resistance appropriate for sunglasses that typically may be subject to diverse conditions of use and abuse, and should be manufacturable by a method adapted efficiently to automated production operations. It will be appreciated that injection molding operations will be complicated and relatively slow insofar as production operations are concerned. Moreover, formation of desired lens curvature by resort to methods based upon in-mold polymerization or the grinding of each lens individually will likewise be tedious and inefficient. While the production of curved light-polarizing lenses can be accomplished by resort to the individual shaping (molding) of blanks from a plastic light-polarizing composite or structure, such as is shown in the aforementioned U.S. Pat. No. 3,560,076 of F. G. Ceppi, the shaping of lenses of uniform thickness results in the production of lenses having optical power. Moreover, increasing lens thickness for the purpose of increasing durability results undesirably in increased optical power.

It will be appreciated that there will be considerable interest in plastic lenses which have good durability, abrasion resistance and other desirable physical attributes, which exhibit little or no optical power and which can be manufactured by resort to simple and efficient methodology.

SUMMARY OF THE INVENTION

It has been found that curved plastic lenses having substantially no optical power and comprising a lamination of a light-polarizing layer between a pair of thermoplastic substrate sheets can be provided by shaping the lamination between heated curved platens (molds) such that the thermoplastic substrate sheets are deformed and rendered flowable and there is produced a composite lens having maximum thickness in the central region of the lens and gradient diminishing thickness toward the periphery of the lens.

In accordance with an article aspect of the invention, there is provided a laminated light-polarizing lens convex on one side and concave on the other side, comprising:

a first transparent sheet of thermoplastic material on said concave side;

a second transparent sheet of thermoplastic material on said convex side; and a curved sheet of light-polarizing material disposed between and bonded to each of said first and second thermoplastic sheets;

said laminated light-polarizing lens having its maximum thickness in the central region of said lens and diminishing gradually in thickness radially toward the periphery of said lens.

In a method aspect of the invention, there is provided a method of forming a plastic lens convex on one side and concave on the other and having its maximum thickness in the central region of said lens and diminishing gradually in thickness radially toward the periphery of said lens, said method comprising the steps of:

providing a laminate comprising a layer of light-polarizing material disposed between and bonded to each of first and second opposed sheets of thermoplastic material;

placing said laminate between opposed concave and convex platens for forming respectively convex and concave surfaces on said laminate, the radius of curvature ($r_1$) of said concave platen and the radius of curvature ($r_2$) of said convex platen each corresponding substantially to the relationship $$r_1 + r_2 = t\left(\frac{n-1}{n}\right)$$

wherein t represents the thickness of said laminate and n is the index of refraction;

heating and pressing said platens together with said laminate therebetween, said heating and pressing being sufficient to deform said opposed sheets of thermoplastic material into a flowable condition and to conform each of said sheets to the respective forming surfaces of said concave and convex platens; said heating and pressing being sufficient to form said laminate into a shaped lens convex on one side and concave on the other, said lens having its maximum thickness in the central region thereof and diminishing gradually in thickness radially toward the periphery of said lens; and removing said shaped lens from between said platens.

For a fuller understanding of the nature and objects of the invention, reference should be had to the following description taken in conjunction with the accompanying drawings.

BRIEF DESCRIPTION OF THE DRAWINGS

FIG. 1 is a perspective view of the respective layers from which an embodiment of a plastic light-polarizing lens of the invention can be formed;

FIG. 2 is a perspective view of a laminated structure comprising the respective layers shown in FIG. 1, from which structure a light-polarizing lens of the invention can be provided;

FIG. 3 is a cross-sectional view of another embodiment of a laminated structure from which a light-polarizing lens of the invention can be provided;

FIG. 4 is a perspective view of one type of press-forming apparatus suitable for performing the method of the present invention;

FIG. 5 is a cross-sectional view of the apparatus of FIG. 4, showing the conduct of one step of the method of the invention;

FIG. 6 is a cross-sectional view of the apparatus of FIG. 4, showing the conduct of a heating and pressing step of the method of the invention;

FIG. 7 is a cross-sectional view of the apparatus of FIG. 4, showing a further lens-removal step of the method of the invention; and FIG. 8 is a side elevation of a preferred embodiment of a completed plastic light-polarizing lens of the invention.

DETAILED DESCRIPTION OF THE INVENTION

As mentioned previously, the present invention is directed to plastic light-polarizing lenses and to a method whereby there are produced such lenses having substantially no power. As applied to a plastic light-polarizing lens of the invention, reference to a lens of substantially no optical power refers, in general, to the absence of magnification or demagnification. Thus, a lens will be considered as having substantially no power where the power is sufficiently low as not to be discernable or detectable by the human eye or where the power is within the limits of a published industry standard for no-power lenses. The production of such lenses by the method of the present invention requires substantial adherence to the requirement of lens-forming platens having predetermined radii of curvature which make possible, under the heating and pressing conditions of the method of the invention, the production of plastic lenses which are of non-uniform thickness, i.e., thickest in the central region and of diminishing thickness radially to the periphery thereof. Thus, the radii of curvature of the respective platens used for forming the convex and concave surfaces of the lenses of the invention conform to an important relationship which is described in greater detail hereinafter and which is predetermined to provide lenses free of undesired optical power.

The requirements for production of lenses of the invention having substantially no power will be better understood by reference to the mathematical formula, (I), for the principal focus (F) of a thick lens of thickness (t), disclosed in the Handbook of Chemistry and Physics, 53rd Edition, 1972, published by the Chemical Rubber Co., page F-85, as follows:

$$F = \frac{nr_1 r_2}{(n-1)[n(r_1 + r_2) - t(n-1)]} \quad \text{(I)}$$

wherein $r_1$ and $r_2$ represent the radii of curvature of the lens and n is the index of refraction.

In the case of a lens of zero power, F is equal to infinity, in which case:

$$n(r_1 + r_2) = (n-1)t$$

Assuming an index of refraction (n) of 1.5, the radii of curvature ($r_1$ and $r_2$) relate to the thickness of the lens according to the following formula, (III):

$$r_1 + r_2 = t/3$$

Thus, where a composite laminate of a thickness of 0.100 inch (100 mils) is to be formed into a lens using a platen having a concave surface with a radius of curvature ($r_1$) of 3.514 inch (in order to form the convex side of the lens), it will be seen that the platen used to form the concave side of the lens will have a convex surface having a radius of curvature ($r_2$) of 3.481 inch.

In contrast, and as is known in the art, the optical power (P) of a lens of uniform thickness (T) is represented by the formula (IV):

$$P = -P_0^2 T \left( \frac{1}{n-1} - \frac{1}{n} \right), \quad \text{(IV)}$$

where T is expressed in meters. If the index of refraction (n) is 1.5 and the nominal power ($P_0$)—equal to the square root of the product of the powers of each of the opposed surfaces—is six, then:

$$P = -36T \left( \frac{1}{1.5 - 1} - \frac{1}{1.5} \right) \quad \text{(V)}$$

and $$P = -48T. \quad \text{(VI)}$$

It can be calculated from formula (VI) that $$P = -0.00122t \quad \text{(VII)}$$

where the thickness (t) is expressed in mils. The power (in diopters) of lenses of different thickness can be calculated readily, using formula (VII), and examples of the power of lenses of different uniform thickness are set forth in the following Table I wherein focal length is expressed in meters:

TABLE I

| t (mils) | P (diopters) | Focal Length |
| --- | --- | --- |
| 30 | −0.0366 | −27.3 |
| 45 | −0.0549 | −18.2 |
| 60 | −0.0732 | −13.66 |
| 75 | −0.0915 | −10.93 |
| 90 | −0.1098 | −9.11 |
| 100 | −0.1220 | −8.20 |

It will be seen from inspection of formula (VII) and from the data set forth in TABLE I that an increase in the thickness of a uniform-thickness lens results in an increase in power. Thus, where lens thickness is increased for the realization of such desired attributes as improved rigidity and durability, there is an accompanying and undesirable increase in lens power.

The requirements of the lens-forming surfaces of platens used for the production of lenses of the invention having no power and non-uniform thickness can be better understood by considering the radii of curvature of platens useful for forming lenses of uniform thickness. For example, an "onion" lens having opposed convex and concave sides and uniform thickness can be analogized to concentric rings of an onion slice. Each onion ring of the same and uniform thickness is defined by convex and concave radii. These radii have different values for each slice. The respective radii for each slice also vary with progression of the rings outwardly to the onion surface. Transparent plastic substrate materials, by analogy to such rings, can be molded into lenses of uniform thickness and the requirements of radii of curvature for platens used in the forming of such "onion" lenses can be determined readily by analogy to the geometry of an onion. Such lenses, however, have optical power which, as described previously, increases with thickness.

It has been found that plastic durable light-polarizing lenses can be produced by using platens of predetermined radii of curvature and thermoplastic substrate materials and shaping conditions of heat and pressure that negate the development of optical power and that promote instead the formation of lenses of non-uniform thickness and substantially no optical power. The particular requirements of radii of curvature and the requirements in respect of the materials and shaping conditions that permit the production of lenses of the invention are described in detail hereinafter.

Referring now to FIG. 1, there are shown in exploded fashion the laminae (sheets) 10, 12 and 14 which form a laminated structure 22 (FIG. 2) from which a plastic light-polarizing lens of the invention is formed. Layer or sheet 10, shown in FIG. 1, comprises a molecularly oriented light-polarizing material which provides the light-polarizing functionality of lenses of the invention. Typically, light-polarizing layer 10 will comprise a linear molecularly oriented dichroic material having a thickness in the range of about 0.1 to 3 mils (about 0.0025 to 0.076 mm.).

A preferred material to serve as polarizer layer 10 is a layer of stretched (oriented) polyvinyl alcohol of about one-mil thickness (0.025 mm.) stained according to known methods with a dichroic dye such as iodine. Such a polarizing material will also be preferably borated for improved stability. Suitable, polarizing layers of this type can be prepared utilizing methods set forth in Reissue U.S. Pat. No. Re. 23,297 and in U.S. Pat. No. 4,166,871. Another preferred polarizing material is a stretched polyvinyl alcohol (PVA) sheet containing polyvinylene light-polarizing species such as may be,- provided by hydrochloric acid vapor processing in known manner. Preferably, such polarizing material will be borated for improved stability. Suitable light-polarizing materials of such type can be prepared in the manner described in U.S. Pat. No. 2,445,555. Other light-polarizing materials can, however, be employed and methods for their production can be found in U.S. Pat. Nos. 2,237,567; 2,527,400; and 2,554,850.

In the production of light polarizers, one or more support or carrier sheets can be employed to improve the durability and handling characteristics of the light-polarizing material. Support sheets of cellulose acetate, cellulose acetate-butyrate (CAB) or of other polymeric material can be used for this purpose. Good results in the production of the plastic lenses hereof can be obtained using a layer of PVA-based light-polarizing material sandwiched between a pair of cellulose triacetate (CTA) films. A preferred light polarizer 10 comprises a layer of PVA-based light-polarizing material having a thickness of about 0.5 to 1.5 mil (0.013 to 0.038 mm.) sandwiched between a pair of cellulose triacetate sheets having a thickness in the range of about 1 to 5 mils (0.025 to 0.127 mm.). An adhesive can be used to promote desired bonding without forming bubbles, haze or other visible defects. Suitable adhesives will be known to those skilled in the art.

Layers (or sheets) 12 and 14 comprise thermoplastic material which can be molded or shaped to the desired curvature of a lens of the invention. Transparent thermoplastic resins known to be useful in the production of optical elements can be used for layers 12 and 14, including poly(methyl methacrylate), polystyrene, polycarbonate and cellulosic thermoplastic materials such as cellulose nitrate, cellulose triacetate (CTA), cellulose acetate propionate, cellulose acetate butyrate (CAB) and ethyl cellulose. In general, suitable materials will be those which are transparent and which show good durability and moldability. In addition, it will be beneficial that the resin material of sheets 12 and 14 exhibit low birefringence and that it show good heat resistance and moisture resistance. Sheets 12 and 14 of moldable resin material can be chosen from among those resinous materials mentioned previously, although others can be used. It will be appreciated that the moldability or processability of the resinous material comprising sheets 12 and 14 needs to be taken into consideration insofar the required molding or lens shaping conditions of temperature and pressure may influence the physical and optical properties of the light polarizer confined between such sheets. Thus, sheets 12 and 14 will comprise a thermoplastic material moldable into a curved lens of the invention without degradation or other harmful and unacceptable influence on light-polarizer layer 10.

Good results can be obtained using sheets 12 and 14 of poly(methyl methacrylate). In general, poly (methyl methacrylate) resins exhibit good durability, transparency and processability and the beneficial attributes and limitations of poly(methyl methacrylate) and others of the aforementioned materials, insofar as their adaptability to the production of optical elements is concerned, are known and described, for example, in U.S. Pat. Nos. 4,986,648 (issued Jan. 22, 1991 to A. Kobayashi) and 5,043,405 (issued Aug. 27, 1991 to T. Koseki). Homopolymers of methyl methacrylate and other methacrylate monomers, such are norbornyl methacrylate, can be used, as can methacrylic copolymers which include repeating units from methyl methacrylate and from other copolymerizable monomers. Examples of such homopolymers and copolymers can be found in the aforementioned U.S. Pat. Nos. 4,986,648 and 5,043,405.

Sheets 12 and 14 can each comprise one or more layers. Good results can be obtained using a single sheet for each of respective layers 12 and 14. In general, it will be preferred that sheet 14 shown in FIGS. 1, 2, 3 and 8 have a thickness greater than that of sheet 12. A differential in thickness permits light polarizer 10 to be positioned in lens 50 (FIG. 8) more closely to the concave face of the lens than to the convex face. Such positioning reduces the amount of curvature-induced stress on polarizer 10 and reduces haze, as is described in the aforementioned U.S. Pat. No. 3,560,076 (issued Feb. 2, 1971 to F. G. Ceppi). In addition, the employment of one sheet of a thickness substantially greater than that of the other provides a greater latitude of processing (e.g., temperature and pressure) conditions which can be employed in a lens-shaping operation, without detrimental influence on the physical integrity and optical properties of light polarizer 10. In general, it will be beneficial to employ a first transparent sheet of thermoplastic material of a first thickness on the concave side of the lens and a second transparent sheet of thermoplastic material on the convex side, of a second thickness greater than about one and one-half times the first thickness. Good results are obtained, for example, using a first sheet of about 30 mils thickness (0.76 mm.) and a second sheet having a thickness of about 60 mils (1.52 mm.), i.e., about twice the thickness of the first sheet. According to a preferred embodiment, each of such sheets will comprise poly(methyl methacrylate).

As shown in FIGS. 1 and 2, a composite laminate 22 is produced by arranging sheets 12 and 14 on opposite sides of light polarizer 10 and adhesively securing the sheets to each other. Various adhesives can be employed for this purpose, provided that they are substantially transparent and provide a haze-free lamination free of bubbles and other unacceptable and visible defects. The respective sheets 12 and 14 can, if desired, include various additives for their known and predetermined effects. Stabilizers, such as ultraviolet-light absorbers, antioxidants, mold-release agents, lubricating agents and surface-active agents can be used. Dyes such as gray, yellow, blue or other dyes can also be employed to obtain a lens of desired density or color. Each of sheets 12 and 14 can include an abrasion-resistant layer or coating to improve the resistance of the lenses to scratching and abrasion. As shown in FIG. 3, laminate composite 22 includes a layer or coating 15 of abrasion-resistant material on each of sheets 12 and 14. Such a layer or coating can comprise, for example, a thermosetting, cross-linked polymer.

The laminate composite structure 22 shown in FIGS. 2 and 3, and from which a light-polarizing lens 50 such as shown in FIG. 8 can be produced, can be produced and utilized in various manners. For example, unitary blanks having the structure shown in FIGS. 2 and 3 can be formed and then molded (shaped) to a desired lens, each blank being produced by a lamination of precut components 10, 12 and 14 of square, round, elliptical or other dimensions. Such blanks can be formed under heat and pressure into a lens and the edges thereof can be ground in known manner suitable to adapt them to placement into spectacle frames. Preferably, a composite structure of finite or endless length can be formed by a continuous or semi-continuous method whereby webs or pieces of thermoplastic sheet material are adhered to the opposed sides of a light-polarizer. Individual blanks can then be cut from the laminate, using a saw, knife laser or other cutting apparatus. Such cutting operation can be conducted at any time prior to the shaping thereof in apparatus such as a press-forming apparatus.

Individual blanks can be pretreated as desired before shaping. For example, lens blanks of predetermined dimensions suited for the particular forming apparatus employed, can be heated and placed immediately or after substantial cooling into the forming apparatus. Good results can be obtained in the case of lenses formed from poly(methyl methacrylate) by heating the lens blanks for 20 to 30 minutes at about 200° F. (93° C.). Other pretreatments can, however, be used, depending upon the particular structure of the laminate to be formed.

The method by which the light-polarizing laminate of this invention is formed into a light-polarizing device concave on one side and convex on the other side will be described below in connection with FIGS. 4 through 7.

The forming process can be carried out by apparatus of the type shown in FIG. 4. The apparatus includes concave platen 24, convex platen 26, means for driving the platens into and out of pressure-applying relationship with each other, and means for alternately heating and cooling the platens during each pressure-applying interval.

Concave platen 24 includes glass member 28 having smooth concave forming surface 30, shaft 32 operatively connected to a suitable drive means, fluid chamber 33, fluid inlet coupling 34, and fluid outlet coupling 36.

Convex platen 26 includes glass member 38 having convex forming surface 40, fixed support means 42, fluid chamber 43, fluid inlet coupling 44, and fluid outlet coupling 46.

As pointed out previously, the respective concave and convex forming surfaces 30 and 40 will have radii of curvature corresponding substantially to the relationship expressed by formula (II).

The drive means includes a suitable hydraulic piston and cylinder arrangement 47 operatively connected to platen 24 for moving platen 24 into and out of pressure-applying relationship with platen 26.

The heating and cooling means for both the platens includes three-way valve means 49, heating fluid conduit 51, cooling fluid conduit 53, and fluid inlet 55 connecting one of the three way valves to each of fluid inlet couplings 34 and 44 of platens 24 and 26 respectively.

Referring now to FIG. 5, laminated structure 22 is placed in concave platen 24 so that relatively thin sheet 12 faces convex platen 26, thereby locating the light-polarizing layer 10 relatively near the convex platen. The concave and convex platens are then moved into pressure-applying relationship, as shown in FIG. 6, to form or shape the laminated structure 22, by the combined effects of pressure and temperature, into a shaped sunglass lens of non-uniform thickness characterized by concave and convex opposed surfaces and maximum thickness in the central region of the lens.

The amount of pressure applied will vary with the particular nature of the composite structure 22, and especially the nature of the thermoplastic materials of sheets 12 and 14, and with the temperatures of the forming surfaces 30 and 40. In the case of a composite comprising a light polarizer of the preferred type described hereinbefore laminated between sheets of poly(methyl methacrylate), pressures in the range of about 250 to 300 lbs./in.$^2$ of lens area (17.6 to 21.1 kg./cm$^2$ of lens area) can be suitably employed. A preferred pressure is about 256 lbs./in.$^2$ (about 18.0 kg./cm$^2$).

While pressure is applied to the laminated structure 22, in the manner aforesaid, the platens are heated by passing hot water through chambers 33 and 43 of platens 24 and 26, respectively. Surfaces 30 and 40 are continually heated sufficiently to cause deformation and flow of the thermoplastic material of sheets 12 and 14 and conformation of the surfaces of laminate 22 to the forming surfaces 40 and 30 of platens 26 and 24. Thermoplastic flow and application of pressure by the platens onto the laminate therebetween causes the laminate 22 to fill the space between the platens and thereby produce a shaped or formed sunglass of non-uniform thickness and substantially no power.

The employment of conditions sufficient to cause thermoplastic flow is important to the production of a lens of the invention inasmuch as such flow assures that the surfaces of layers 12 and 14 conform to the platen surfaces 40 and 30, respectively. In the absence of conditions of temperature and pressure sufficient to fill the space between the forming surfaces, the uniform thickness of the laminate placed between the platens remains unchanged and there is produced a lens having optical power. As pointed out previously (TABLE I), the optical power of a lens of uniform thickness increases with the thickness thereof.

The method of the present invention can be used for the production of lenses which are relatively thick and which have, therefore, the durability associated with such thickness. Lenses which vary widely in thickness can be produced. The method of the present invention will, however, be especially applicable to the production of relatively thick lenses which, if of uniform thickness, would exhibit unacceptable power. Thus, the method is especially useful for the production of no-power lenses of a thickness of 50 mils (1.27 mm.) or greater, for example, in the range of about 50 to 150 mils (1.27 to 3.81 mm.). A durable lens having a preferred thickness of from 60 to 100 mils (1.52 to 2.54 mm.) can be produced readily using the method of the invention.

In the production of a light-polarizing lens of the invention, it will be convenient to utilize a platen 24 having a forming surface 30 which corresponds to the predetermined curvature of the convex side of the lens to be formed. It can be appreciated that the convex surface of sheet 14 (formed against forming surface 30) may serve as the outer surface of a sunglass lens. A suitable radius of curvature for surface 30 for forming a convex sunglass lens surface is 3.514 inches.

Using the formula (III), appropriate for calculating the radii of curvature required for lenses having no optical power, and assuming that the radius of curvature of formed surface 30 ($r_1$) is 3.514 inches, the radius of curvature of the opposed lens surface (and platen) can be determined for the production of a lens of any nominal thickness. In TABLE II is shown the radius of curvature of forming surface 40, appropriate for the production (from a laminate of given thickness) of a lens having no power. Also shown in TABLE II is the radius of curvature required for the production of a lens of uniform thickness (and exhibiting optical power) where one forming surface has a radius of curvature of 3.514 inches and the other is calculated by subtracting the thickness therefrom.

TABLE II

| thickness (in.) | Radius of Curvature ($r_2$), in inches | |
|---|---|---|
| | Non-Uniform Lens | Uniform Lens |
| 0.020 | 3.507 | 3.494 |
| 0.030 | 3.504 | 3.484 |
| 0.040 | 3.501 | 3.474 |
| 0.050 | 3.497 | 3.464 |
| 0.060 | 3.494 | 3.454 |
| 0.070 | 3.491 | 3.444 |
| 0.080 | 3.487 | 3.434 |
| 0.100 | 3.481 | 3.414 |
| 0.110 | 3.477 | 3.404 |
| 0.120 | 3.474 | 3.394 |

From Table II, it can be seen that a zero-power lens of nominal thickness of 0.100 inch (100 mils) is formed using one forming surface having a radius of curvature ($r_1$) of 3.514 inches and other having a radius of curvature ($r_2$) of 3.481 inches. In the case of light-polarizing lenses formed from poly(methyl methacrylate) using the method of the invention, good results were obtained using a platen having a forming surface with a radius of curvature of 3.479 inches (an approximation of the calculated value of 3.481 inches).

From Table II, it can be seen that a forming surface having a radius of curvature of 3.414 inches would be suitable for production of a lens of uniform 100-mil thickness and accompanying optical power. In addition, the difference in platen requirements for the production of a zero-power non-uniform thickness lens in one case and a lens having power and uniform thickness in another case can be better understood by observing that the requirements of platens (radii of curvature 3.514 and 3.481 inches) used for the production of a 100-mil thickness, zero-power, non-uniform lens of the invention approximate the requirements of platens (radii of curvature 3.514 and 3.484 inches) appropriate for the production of a lens having uniform thickness, optical power and a thickness of only 30 mils.

The conditions of temperature and pressure sufficient to effect flow of the thermoplastic layers 12 and 14 during the production of lenses of the invention cause the composite lens blank to conform to the radii of curvature of the platens. As a consequence, a lens prepared from a composite lens blank of 100-mil thickness and having a diameter of 2.5 inches (63.5 mm.) will exhibit a thickness of about 101 mils (2.565 mm.) in the central and thickest region of the lens and a thickness diminishing gradually and radially to the periphery having a thickness of about 97 mils (2.464 mm.).

The requisite temperature for creating deformation and flow of the thermoplastic material of sheets 12 and 14 will vary with the chemical composition of the thermoplastic material. Using poly(methyl methacrylate) sheets, molding temperatures of from about 300° to 320° F. (149° to 160° C.) provide good results. A preferred molding temperature is about 305° F. (152° C.).

The temperature of the forming surfaces of the platens can be controlled by the passage of heated water and cooled water, as described previously. The platens preferably will be preheated, i.e., prior to placement of the composite laminate therebetween, and will be heated to the requisite forming temperature for a heating cycle sufficient to provide the desired shaped lens. For example, the forming surfaces of the platens can be preheated to about 185°–190° F. (85°–88° C.) in the case of poly(methyl methacrylate) thermoplastic materials, in advance of placing the composite laminate into the mold and closing the mold within about 10 seconds. The mold surfaces are then heated to the requisite forming temperature by the passage of heated water through the platens and temperature is maintained for a duration (e.g., 80 to 90 seconds) sufficient to effect desired lens formation. Thereafter, the temperature of surfaces 30 and 40 is reduced by passage of a cooling fluid, such as relatively cool water, through chambers 33 and 43 of the platens. The cooling fluid is passed through the platens for a duration, e.g., for about 30 seconds.

Hot water is supplied to the platens through conduits 51 and the relatively cool water is supplied through conduits 53. During the heating cycle, valve 49 opens a connecting passage between conduit 51 and inlet 55 and closes conduit 53; oppositely, during the cooling cycle, the valve opens a connecting passage between conduit 53 and inlet 55 and closes conduit 51. The transition from the heating cycle to the cooling cycle is carried out by operating valves 49 to mix cool water with the hot water until the hot water is completely displaced by cool water. Transition from cooling cycle to heating is carried out by reversing the operation.

After the cooling operation, platens 24 and 26 are separated to relieve the pressure on laminated structure 22 and permit its removal, as shown in FIG. 7. The laminated structure may adhere to one of the platens, from which it may be removed by a stream of compressed air supplied by air nozzle 48.

FIG. 8 illustrates a formed light-polarizing lens, 50, concave on the side formed by convex platen 26 and convex on the side formed by concave platen 24.

Using the apparatus shown in FIG. 4 and the conditions herein described, light-polarizing lenses of substantially no power and which exhibit good durability can be provided. Other apparatus can, however, be employed and variations in process conditions, such as heating and cooling cycles, can be used to advantage, depending upon the particular materials used for the production of composite laminate 22. Sunglass lenses can be formed rapidly, for example, within about 130 seconds between loading a composite blank into the platens and removing a shaped lens. The method of the present invention, thus, provides a simple and effective means of satisfying the objectives of producing relatively thick, light-polarizing shaped lenses exhibiting good durability.

Since certain changes may be made in the above product and method without departing from the scope of the invention herein involved, it is intended that all matter contained in the above description or shown in the accompanying drawings shall be interpreted as illustrative and not in a limiting sense.

What is claimed is:

1. A method of forming a plastic lens convex on one side and concave on the other and having its maximum thickness in the central region of said lens and diminishing gradually in thickness radially toward the periphery of said lens, said method comprising the steps of:

providing a laminate comprising a layer of light-polarizing material disposed between and bonded to each of first and second opposed sheets of thermoplastic material;

placing said laminate between opposed concave and convex platens for forming respectively convex and concave surfaces on said laminate, the radius of curvature ($r_1$) of said concave platen and the radius of curvature ($r_2$) of said convex platen each corresponding substantially to the relationship $$r_1 + r_2 = t\left(\frac{n-1}{n}\right)$$

wherein t represents the thickness of said laminate and n is the index of refraction;

heating and pressing said platens together with said laminate therebetween, said heating and pressing being sufficient to deform said opposed sheets of thermoplastic material into a flowable condition and sufficient to conform each of said sheets to the respective forming surfaces of said concave and convex platens; said heating and pressing being sufficient to form said laminate into a shaped lens convex on one side and concave on the other, said lens having its maximum thickness in the central region thereof and diminishing gradually in thickness radially toward the periphery of said lens; and removing said shaped lens from between said platens.

2. The method of claim 1 wherein said layer of light-polarizing material comprises a molecularly oriented dichroic material.

3. The method of claim 2 wherein said sheet of light-polarizing material comprises a stretched sheet of polyvinyl alcohol stained with iodine.

4. The method of claim 3 wherein said sheet of polyvinyl alcohol has a thickness in the range of about 0.0025 to 0.076 mm.

5. The method of claim 1 each of said first and second opposed sheets of thermoplastic material comprise an acrylic polymer.

6. The method of claim 5 wherein each of said sheets of acrylic polymer comprises poly(methyl methacrylate).

7. The method of claim 6 wherein the sheet formed by said concave platen has a thickness greater than about one and one-half times the thickness of the sheet formed by said convex platen.

8. The method of claim 7 wherein said laminate placed between said concave and convex platens is a lens blank cut from an endless web supply of said laminate.

9. The method of claim 8 wherein said lens blank placed between said platens has a thickness of about 1.27 mm or greater.

10. The method of claim 9 wherein said heating is conducted at a temperature of about 149° to 160° C. and said pressing together of said platens with the lens blank therebetween is conducted at a pressure of about 17.6 to 21.1 kg/cm² of lens area.

11. The plastic lens made by the method of claim 1.

* * * * *